May 3, 1927.
J. B. LEIGHTON
1,626,740
SELF LUBRICATING SPRING
Filed Feb. 4, 1925
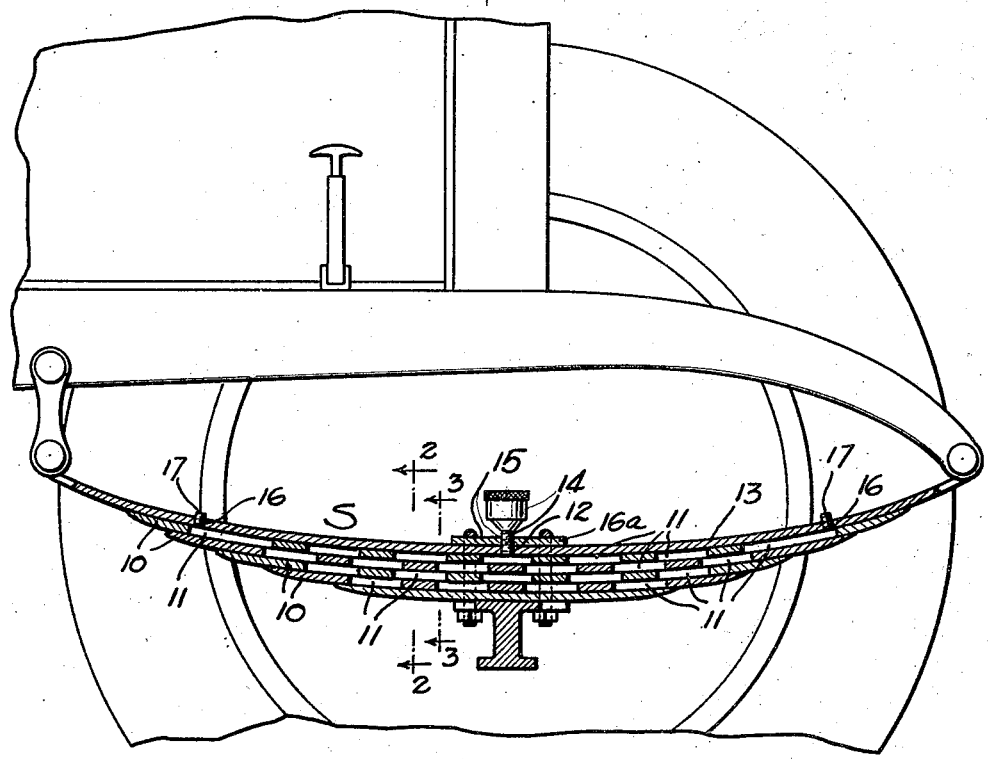
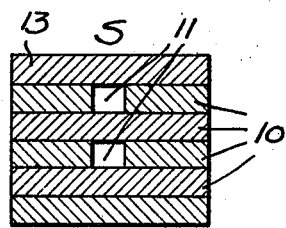
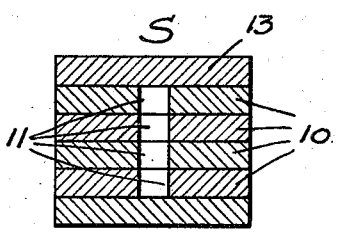
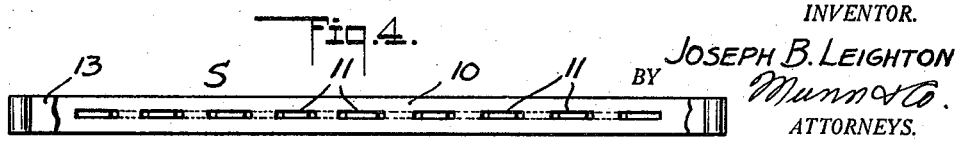
INVENTOR.
JOSEPH B. LEIGHTON
BY Munn & Co.
ATTORNEYS.

Patented May 3, 1927.

UNITED STATES PATENT OFFICE.

JOSEPH BLAIR LEIGHTON, OF LOS ANGELES, CALIFORNIA.

SELF-LUBRICATING SPRING.

Application filed February 4, 1925. Serial No. 6,801.

My invention relates to and has for its purpose the provision of a self-lubricating spring of simple, substantial, and inexpensive construction, which is particularly adapted, although not necessarily, for use in connection with motor vehicles, and which has incorporated therein, means for receiving and distributing lubricating oil to the leaves of the spring in such manner that when the spring is flexed, vibrated, or in any manner moved to cause relative movement of the leaves thereof, the oil will be fed between the leaves and thus effect proper and thorough lubrication thereof.

Another purpose of my invention is the provision of a spring of the above described character in which means is provided to permit the introduction of compressed air, steam or the like into the leaves of the spring for the purpose of removing old oil, or foreign substances therefrom, incident to the application of new lubricant thereto.

I will describe only one form of self-lubricating spring embodying my invention and will then point out the novel features thereof in the claim.

In the accompanying drawings

Figure 1 is a view showing in vertical longitudinal section, one form of self-lubricating leaf spring embodying my invention in applied position with respect to a vehicle.

Figures 2 and 3 are enlarged detail sectional views taken respectively on the lines 2—2 and 3—3 of Figure 1.

Figure 4 is a detail plan view of the spring the master leaf of which is partly broken away.

Referring specifically to the drawings in which similar reference characters designate similar parts in each of the several views, my invention in its present embodiment is incorporated in a leaf spring S of the usual type consisting of a plurality of graduated leaves superimposed upon each other and secured together and to the chassis and axle of a vehicle in a conventional manner.

As shown in Figure 4, each of the intermediate leaves 10 of the spring are provided with a plurality of slots 11 disposed along the longitudinal center line and extending lengthwise of the spring. As viewed in Figure 1, the slots of one leaf are staggered with respect to the slots of adjacent leaves and are of such length and spacing that their ends overlap and thereby provide communicating passages. This arrangement of slots forms a multiplicity of pockets or chambers between the leaves to which lubricating oil is adapted to be supplied through the passages and from an inlet opening 12 formed in the master leaf 13 of the spring, the opening 12 communicating with one of the pockets in the adjacent leaf. The opening 12 is threaded to receive a filler cup 14, which latter extends through an opening 15 provided in a plate 16ª forming a part of the usual means for securing the spring to the axle of a vehicle.

Arranged adjacent the ends of the main leaf 13 and in communication with the outermost of the slots 11 in the adjacent leaf are outlet openings 16 normally closed by means of threaded plugs 17 which are removable for a purpose to be hereinafter described.

In practice, the oil gravitates from the cup 14, which constitutes a lubricant reservoir, into the adjacent pocket from which it is distributed through the passages to all of the pockets between the leaves. Now that all of the pockets are supplied with oil, it will be readily understood that under relative sliding movement of the leaves, due to the flexing of the spring, the oil will be fed between the leaves of the spring and thereby effectively lubricate the contacting surfaces of the leaves.

In the event that it is desired to remove old oil or foreign substances from the pockets, the plugs 17 and the filler cup 14 are removed and an air or steam hose applied to the inlet opening 12 thus forcing out the oil or foreign substances from the pockets, through the opening 16.

From the foregoing description, it will be manifest that I have provided a self-lubricating spring which requires but slight modification to form a reservoir for lubricating oil, the reservoir automatically distributing the oil to the contacting surfaces of the leaves as the spring is flexed.

Although I have herein shown and described only one form of self-lubricating spring embodying my invention, it is to be understood that various changes and modifications may be made herein without departing from the spirit of the invention and the spirit and scope of the appended claim.

What I claim is:

A vehicle spring comprising a plurality of superimposed leaves, each of the intermediate leaves of which is provided with a plurality of spaced apart and longitudinally alined slots extending substantially the entire length of and through the thickness of the leaves, the slots of one leaf being arranged in staggered relation to the slots of adjacent leaves and of such length that the ends of the slots of adjacent leaves overlap so as to provide communicating pockets throughout substantially the entire length of the leaves, and an oil inlet in one of the exterior leaves communicating with one of said pockets and through which oil is adapted to be supplied to all of the pockets whereby when the spring is flexed the oil will be distributed to the coacting surfaces of the leaves.

JOSEPH BLAIR LEIGHTON.